United States Patent [19]
Rye

[11] Patent Number: 5,384,178
[45] Date of Patent: Jan. 24, 1995

[54] TUBE SETTLER ASSEMBLY

[75] Inventor: Palle Rye, Reading, Pa.

[73] Assignee: Brentwood Industries, Inc., Reading, Pa.

[21] Appl. No.: 131,064

[22] Filed: Oct. 4, 1993

[51] Int. Cl.⁶ .................. B32B 3/28; F02M 17/28; C10J 1/08
[52] U.S. Cl. .................. 428/182; 428/179; 428/184; 428/185; 428/192; 428/212; 428/223; 52/795; 52/798; 261/112.2; 261/DIG. 72
[58] Field of Search .......... 428/174, 182, 184, 33, 428/58, 59, 99, 118, 141, 178, 179, 223, 332; 52/795, 798, 800; 261/112.2, DIG. 72

[56] References Cited
U.S. PATENT DOCUMENTS

| | | | |
|---|---|---|---|
| 4,668,443 | 5/1987 | Rye | 428/183 |
| 4,800,047 | 1/1989 | Monjoie | 261/112.2 |
| 5,217,788 | 6/1993 | Rye | 428/184 |

*Primary Examiner*—Donald J. Loney
*Attorney, Agent, or Firm*—Schwarze, Jacobs & Nadel Panitch

[57] ABSTRACT

This invention relates to an assembly comprising a first corrugated sheet and a second generally planar sheet. The corrugations form alternating apices on opposite sides and equidistant from a central major plane in the first sheet, where the apices are connected by angled walls. The second sheet has a central major plane which is generally parallel to the central major plane of the first sheet. The second sheet has complementary regions disposed in overlapping adjacent complementary relation to, and abutting the apices of, the first sheet. The second sheet has undulating regions disposed between the complementary regions, where the undulating regions alternate above and below the central major plane of the second sheet. The undulating regions alternating above the central major plane of the second sheet have a peak wavefront and the undulating regions alternating below the central major plane of the second sheet have a valley wavefront, whereby the wavefronts of the undulating regions are angled with respect to longitudinal axes of the complementary regions to an extent necessary to interlock adjacent first and second sheets.

19 Claims, 3 Drawing Sheets

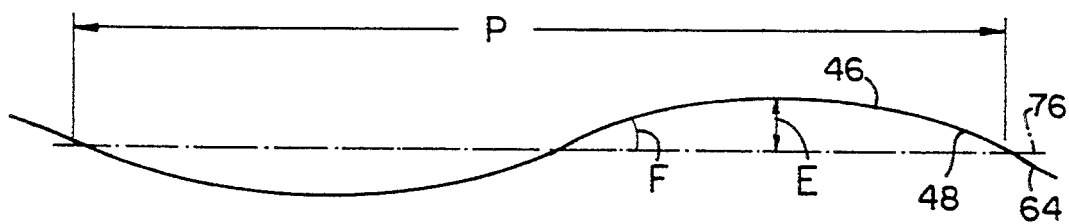
FIG. 6A
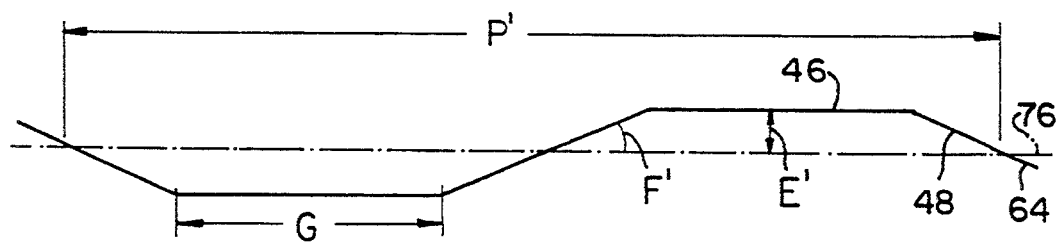
FIG. 6B
FIG. 6C
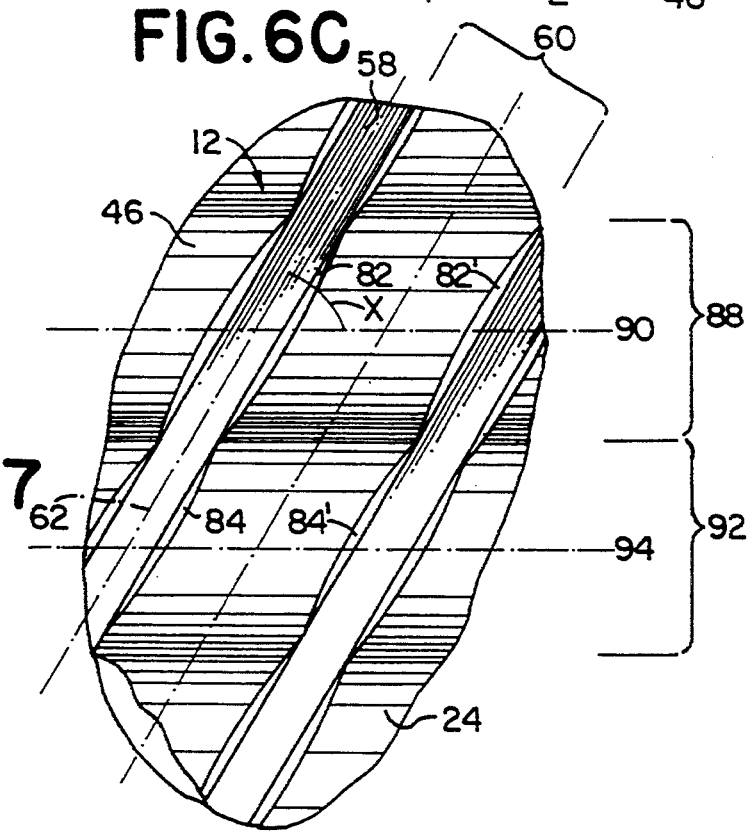
FIG. 7

TUBE SETTLER ASSEMBLY

FIELD OF THE INVENTION

The present invention relates to an assembly comprising corrugated and generally planar sheets and, more particularly, to an assembly which may be adapted primarily for use in removing particulates suspended in a generally liquid medium.

BACKGROUND OF THE INVENTION

The assembly of the present invention may be adapted primarily for use to separate particulates or sediment suspended in a liquid medium, such as in water and wastewater treatment processes. However, the present assembly may also be adapted for use as heat transfer media or contact bodies, for example in an evaporative-type heat exchange apparatus, as fill for gas scrubbers for reducing air pollution, and as other surface media for use in trickling filters for water treatment, air scrubbing or stripping equipment. This invention will be explained herein with reference to its primary intended use as to separate particulates and sediment from water in water and wastewater treatment processes. An assembly used for this purpose is generally referred to as a tube settler.

The selection of a method for removing impurities from wastewater depends upon the nature of the pollutants or undesirable contaminants present. Major contaminants in wastewater include: (1) suspended solids; (2) greases and oils; (3) organic matter; (4) dissolved metals; and (5) toxic chemicals. Large suspended solids and trash may be removed from water by screening devices. Suspended solid particles may be removed from a stream by gravitational settling or sedimentation.

The device of the present invention is particularly suited to provide an environment wherein suspended solids may be removed from a stream by gravitation settling or sedimentation. The device of the present invention may also advantageously be used as a contact body to promote the intimate mixture of and heat exchange between two counter-flowing or cross-flowing fluid streams. The device of the present invention may also find use as a contact body for promoting the intimate contact of gas and liquids. Yet another use for the device of the present invention is as an artificial reef for marine environments.

The prior art discloses many different contact bodies assembled from alternating generally planar sheets and corrugated sheets. The prior art also discloses many different contact bodies formed by stacking a single sheet having various configurations.

U.S. Pat. No. 5,217,788 discloses an assembly made from a plurality of generally parallel corrugated contact sheets. The sheets have generally planar positioner pads positioned at least at some of the intersections formed by the apices of adjacent sheets coming together. The apices have indented portions between each positioner pad.

U.S. Pat. No. 4,800,047 discloses an assembly of trickling sheets of rectangular form for a packing means for an installation used for bringing into contact a liquid and a gas flowing in a counter-current manner, where each sheet is characterized as comprising a first zone which is greatly corrugated and a second zone which is slightly corrugated or flat. The sheets contain spacer bosses. Upon stacking the sheets in a specified manner, the resulting assembly is a packing element with rectilinear channels.

U.S. Pat. No. 4,668,443 discloses improved gas liquid contact sheets and contact bodies formed from a plurality of those contact sheets, where the improvement comprises having positioner pads positioned in apices of the corrugations of the contact sheets such that at least about eighty percent of the intersections of adjacent sheets contain abutting pairs of the positioner pads.

U.S. Pat. No. 2,160,677 discloses a corrugated sheet with corrugations of a trapezoidal cross-section, where the side walls of the corrugations are reinforced through additional or transverse corrugations extending at right angles to the main or longitudinal corrugations. The transverse corrugations impart a zig-zag outline to the edges of a plane forming the top or bottom of the trapezoidal corrugations.

U.S. Pat. No. 2,091,918 discloses an insulating material comprising a corrugated sheet and a planar lining sheet, where the lining sheet has indentations or depressions which are complementary to the apices of the corrugated sheets and cause the lining to interengage with the crowns of the corrugations. In this way, the employment of paste or other adhesive to join the lining and corrugated sheets is eliminated.

Several U.S. patents disclose assemblies, and/or processes for making assemblies, comprising alternating corrugated and planar sheets, e.g., U.S. Pat. Nos. 3,265,550, 3,099,696, 3,048,918, 2,986,379, and 2,809,918.

Compared to the prior art, the present invention provides a contact body particularly suited as a tube settler for wastewater treatment, and having superior manufacturing ease and performance as a tube settler.

SUMMARY OF THE INVENTION

The present invention relates to an assembly comprising a first corrugated sheet and a second generally planar sheet, the corrugations forming alternating apices on opposite sides and equidistant from a central major plane in the first sheet, the apices in the first sheet being connected by angled walls, the second sheet having a central major plane which is generally parallel to the central major plane of the first sheet, the second sheet having complementary regions disposed in overlapping adjacent complementary relation to, and abutting the apices of, the first sheet, and undulating regions disposed between the complementary regions, the undulating regions alternating above and below the central major plane of the second sheet, the undulating regions alternating above the central major plane of the second sheet having a peak wavefront and the undulating regions alternating below the central major plane of the second sheet having a valley wavefront, whereby the wavefronts of the undulating regions are angled with respect to longitudinal axes of the complementary regions to an extent necessary to interlock adjacent first and second sheets.

BRIEF DESCRIPTION OF THE DRAWINGS

The foregoing summary, as well as the following detailed description of preferred embodiments of the invention, will be better understood when read in conjunction with the appended drawings, in which like numerals are used to indicate like elements throughout the several views. For the purpose of illustrating the invention, there is shown in the drawings embodiments which are presently preferred. It should be understood, however, that the invention is not limited to the precise arrangements and instrumentalities shown.

FIG. 6A is a schematic, partial cross-sectional drawing of the first embodiment of the assembly taken along a centerline 64 of FIG. 1, where the undulating regions take the form of a sinusoidal wave.

FIG. 6B is a schematic, partial cross-sectional drawing of a second embodiment of the assembly according to the present invention corresponding generally to a view as in FIG. 6A, where the undulating regions take the form of a "trapezoidal" wave.

FIG. 6C is a schematic, partial cross-sectional drawing of a third embodiment of the assembly according to the present invention corresponding generally to a view as in FIG. 6A, where the undulating regions take the form of a "sawtooth" wave.

FIG. 7 is an enlarged view of that region of FIG. 1 designated "FIG. 7".

DETAILED DESCRIPTION OF THE PREFERRED EMBODIMENTS

The device of the present invention comprises generally planar sheets and corrugated sheets, each having a particular structure. The particular structures of the generally planar sheets and the corrugated sheets allow them to be readily joined together so as to create an assembly comprising alternating generally planar sheets and corrugated sheets. As will be described in detail below, the particular structure of a generally planar sheet has features that correspond to complementary features present in the particular structure of a corrugated sheet. This intentional correspondence between features of generally planar and corrugated sheets provides a means for positioning and securing a generally planar sheet in intimate contact with an adjacent corrugated sheet, to thereby conveniently construct and internally secure the assembly of the present invention.

Figure 1:
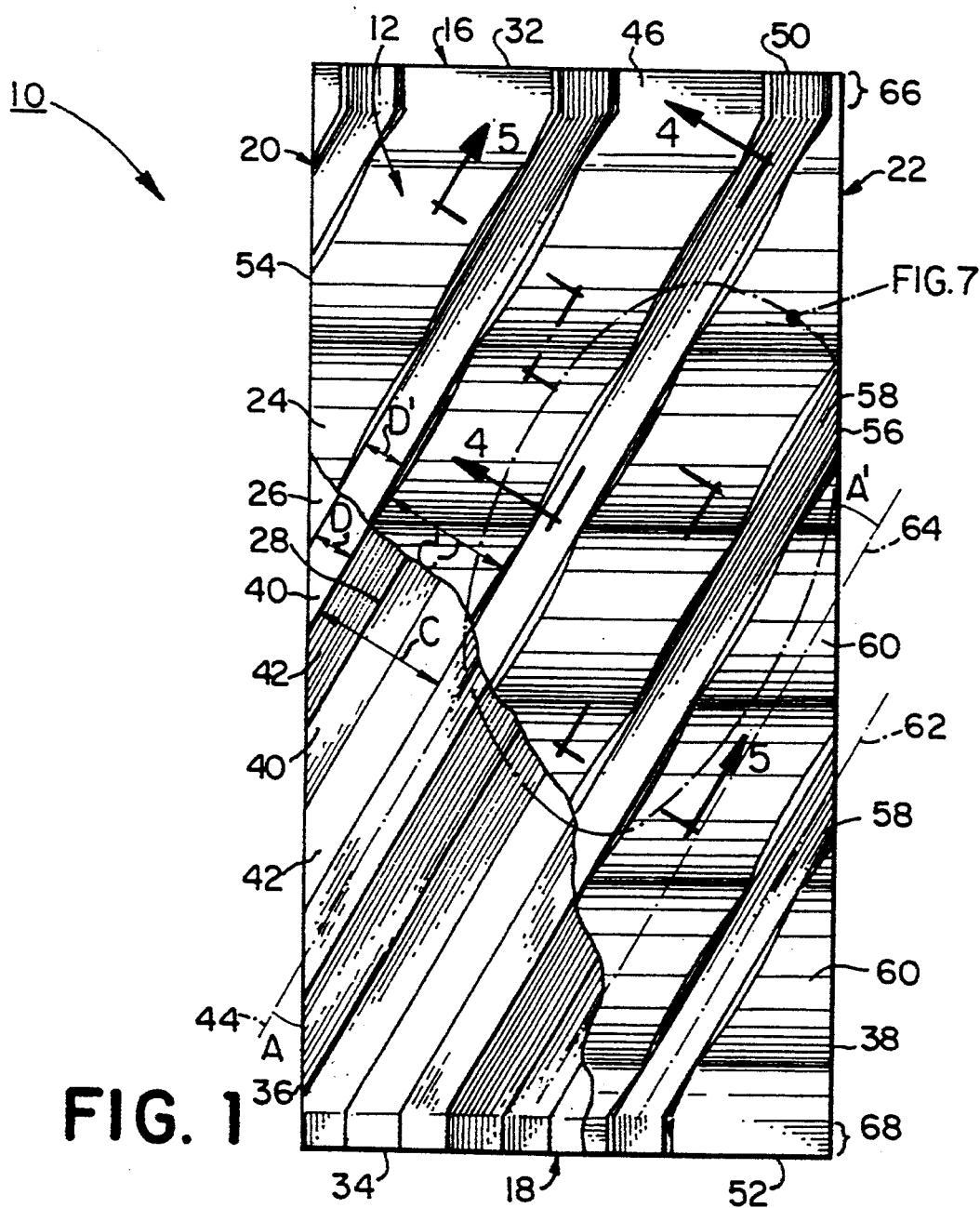
FIG. 1 is a front elevational view of a first embodiment of the assembly of the present invention, with the front generally planar sheet partly broken away to reveal the adjacent corrugated sheet.

FIGS. 1-5, 6A and 7 show key features of a first embodiment of the inventive assembly, generally designated 10. FIG. 1 is a front elevational view of the assembly 10 in its preferred orientation when used as a tube settler, however its orientation may be different when the assembly is used for other purposes. With respect to the orientation of FIG. 1, and for the sake of convenient description and without limiting other orientations or uses, the assembly 10 has a front face 12, a rear face 14 not shown in FIG. 1 but visible in FIGS. 2-5, a top side 16, a bottom side 18 opposite the top, a left side 20, and a right side 22 opposite the left side.

FIG. 1 is a front elevational view of the assembly 10, showing a generally planar sheet 24 which is partially broken away to show an adjacent corrugated sheet 26.

Figure 2:
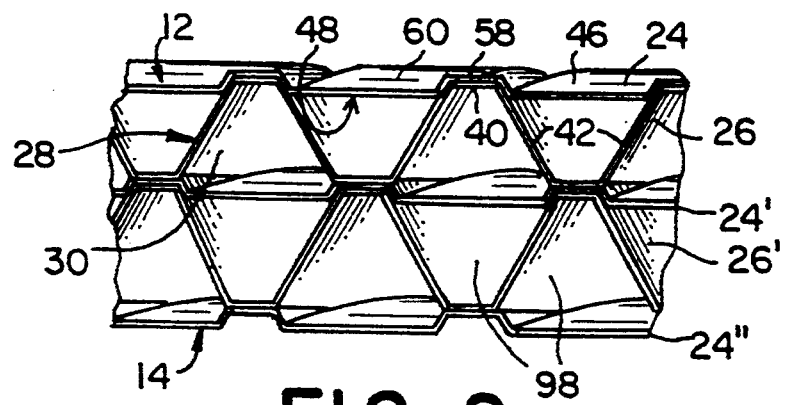
FIG. 2 is a partial bottom plan view of the first embodiment of the assembly shown in FIG. 1.
Figure 3:
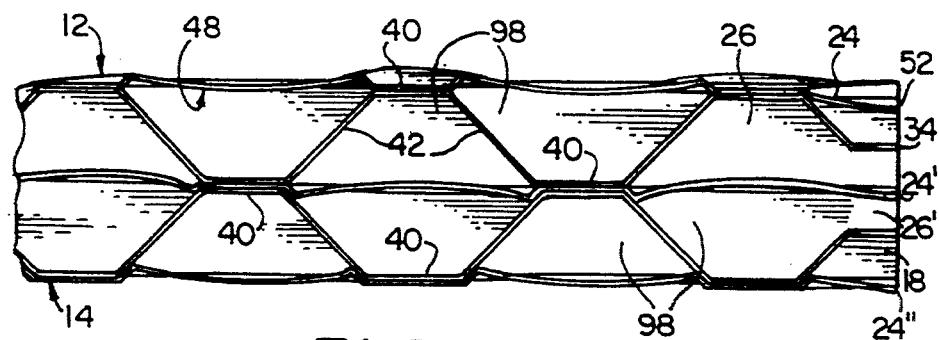
FIG. 3 is a partial side elevational view of the first embodiment of the assembly taken along a portion of the left side of FIG. 1, and rotated 90° counterclockwise for convenience of illustration.
Figure 5:
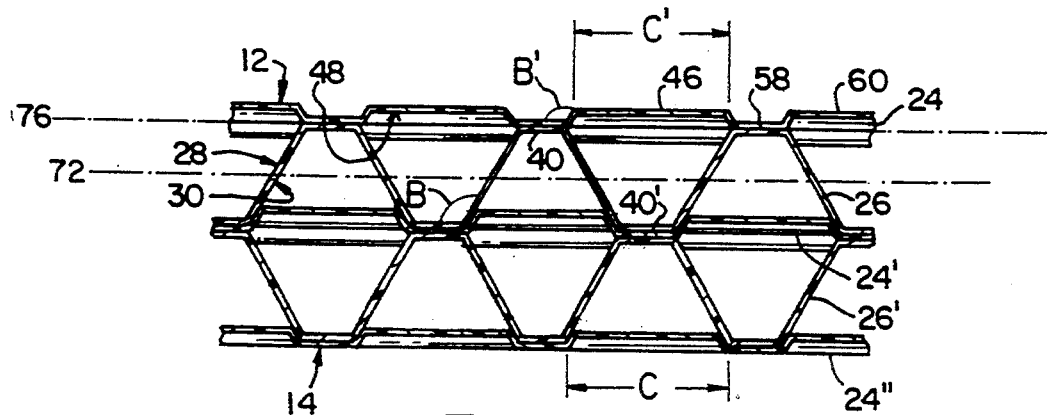
FIG. 5 is a partial cross-sectional view of the first embodiment of the assembly taken along line 5—5 of FIG. 1.

With respect to the orientation of FIG. 1, and for the sake of convenient description and without limiting other orientations or uses, the corrugated sheet 26 has a front face 28 as shown in FIGS. 1, 2, 3 and 5, and a rear face 30 as shown in FIGS. 2, 3 and 5. Corrugated sheet 26 also has a top edge 32, a bottom edge 34, a left edge 36 and a right edge 38 as shown and designated according to the orientation of FIG. 1. A corrugated sheet comprises a plurality of apices 40, which preferably are generally flattened as shown, but they need not be flattened, and which alternate with angled walls 42 that connect the apices to each other, as best shown in FIG. 5. The corrugations preferably but need not necessarily run in a linear manner, parallel to each other, and have longitudinal axes, such as longitudinal axis 44 shown in FIG. 1.

With respect to the orientation of FIG. 1, and for the sake of convenient description and without limiting other orientations or uses, the generally planar sheet 24 has a front face 46 as shown in FIGS. 1-7, and a rear face 48 as shown in FIGS. 2-6C. Generally planar sheet 24 also has a top edge 50, a bottom edge 52, a left edge 54 and right edge 56 as shown and designated according to the orientation of FIG. 1. A generally planar sheet comprises a plurality of alternating strips, denoted as complementary regions 58 and undulating regions 60, as shown in FIGS. 1, 2, 5 and 7. The complementary regions 58 preferably are generally flat, as shown, but need not be, so long as they are complementary to the shape of the apices 40 of the corrugated sheets 26. The generally flattened complementary regions and undulating regions each have a longitudinal axis, 62 and 64 respectively, where those longitudinal axes are parallel to each other, as shown in FIGS. 1 and 7.

Assembly 10 comprises a plurality of alternating generally planar sheets and corrugated sheets, as is best illustrated in FIGS. 2 through 5. FIGS. 2 through 5 show various views of a first presently preferred embodiment of assembly 10, comprising a sequence of generally planar sheets, namely generally planar sheets 24, 24' and 24". FIGS. 2 through 5 also illustrate a sequence of corrugated sheets disposed in alternating fashion between generally planar sheets, where corrugated sheet 26 is disposed between generally planar sheets 24 and 24', and corrugated sheet 26' is disposed between generally planar sheets 24' and 24".

It is to be understood that the assembly 10 may comprise more or less than three generally planar sheets and more or less than two corrugated sheets, but that generally planar sheets will always alternate with corrugated sheets in forming assembly 10. Moreover, although the assembly 10 is shown with its components generally in scale in FIG. 1, the other FIGS. are enlarged compared to FIG. 1 to illustrate particular details.

As illustrated in FIG. 1, in a presently preferred embodiment of the invention, the corrugations of a corrugated sheet have longitudinal axes 44 which preferably but not necessarily are at an oblique angle relative to a side of the sheet, throughout all or most of the height of the sheet. In a more preferred embodiment, as illustrated in FIG. 1, the longitudinal axes 44 of the corrugations of a corrugated sheet are perpendicular to the top and bottom edges of a corrugated sheet in the top portion 66 and bottom portion 68 of the assembly 10. For example, and in reference to FIG. 1, the longitudinal axes 44 are disposed at an oblique angle A to the left edge 36 of corrugated sheet 26, and are disposed in a perpendicular direction to the top edge 32 and to the bottom edge 34 of corrugated sheet 26 in the top portion 66 and bottom portion 68 respectively of assembly 10. Likewise, the longitudinal axes of the generally flattened complementary regions 58 and the undulating regions 60 of a generally planar sheet 24 are preferably, but not necessarily, angled relative to a side of the sheet. For example, and in reference to FIG. 1, longitudinal axes 62 and 64 are disposed at an oblique angle A' to the right edge 56 of generally planar sheet 24 and are perpendicular to the top edge 50 and bottom edge 52 of generally planar sheet 24.

The oblique angle A at which a longitudinal axis of a corrugation meets a side edge of a corrugated sheet, and the oblique angle A' at which a longitudinal axis of a generally flattened complementary region meets the corresponding side edge of a generally planar sheet are substantially equal to each other. This intentional correspondence between particular features, i.e., the oblique angles A and A', and the shapes of the apices 40 and the complementary regions 58 of a corrugated sheet and a generally planar sheet, respectively, contributes to the advantages of the present invention.

As illustrated best in FIG. 1, the top portion 66 of the generally flattened complementary regions and the undulating regions of a generally planar sheet preferably, but not necessarily, have longitudinal axes which are perpendicular to the horizontal, and the top portions 66 of the corrugations of a corrugated sheet preferably, but not necessarily, have axes which are perpendicular to the horizontal. Likewise, the bottom portions 68 of the generally flattened complementary regions and the undulating regions of a generally planar sheet preferably, but not necessarily, have longitudinal axes which are perpendicular to the horizontal, and the bottom portions 68 of the corrugations of a corrugated sheet preferably, but not necessarily, have axes which are perpendicular to the horizontal.

It is preferred for the manufacture and structural performance of the present invention that the corrugations in the top and bottom portions 66, 68 of assembly 10, and the generally flattened complementary regions and the undulating regions in the top and bottom portions of assembly 10, have longitudinal axes which are perpendicular to the horizontal, at least when assembly 10 is used as a tube settler. By providing the sheets 24 with generally flattened complementary regions and undulating regions and the sheets 26 with corrugations all having top and bottom portions with longitudinal axes which are perpendicular to the horizontal, manufacture of the sheets is enhanced by the use of standard forming and cutting tooling. This arrangement also enhances structural performance by providing flat, horizontal bottom and top edges for an upright orientation and a stronger supporting configuration when assembly 10 is used as a tube settler. By having flat, horizontal bottom and top edges, tube settlers or other assemblies 10 can be stacked on each other.

Each of the corrugated sheets comprises a plurality of corrugations, as best illustrated in FIGS. 2, 3 and 5. It is preferred that the peaks and valleys be flattened as illustrated, primarily to provide for more certain orientation and assembly of the sheets into tube settlers. The flattened apices have a width, designated D, where the width of one flattened complementary apex preferably is substantially equal to the width of every other flattened apex of a corrugated sheet. As can be best seen in FIG. 5, the apices form peaks and valleys, such as peak 40 and valley 40'.

Adjacent peaks and valleys are connected by angled walls. Thus, for example, with reference to FIG. 5, and with respect to peak 40 of sheet 26, on the right hand side (corresponding to a downwardly extending wall in the orientation of FIG. 5) the corrugation includes an angled wall 42 connecting peak 40 to valley 40'. Since the designation "peak" for peak 40 and "valley" for valley 40' depends upon the viewer's reference point, the generic term "apex" (or the plural "apices") is preferred and will generally be used to designate either peak 40 or valley 40'. The angled walls meet an adjacent apex at an angle designated B, as seen in FIG. 5.

The corrugations of a corrugated sheet run through the major plane of the corrugated sheet, where that major plane is parallel to and equidistant from the apices, and is designated 72 in FIG. 5. Adjacent peaks are on the same side of the major plane 72, and adjacent peaks are separated by a distance C. Adjacent valleys likewise are preferably separated by the same distance C.

Figure 4:
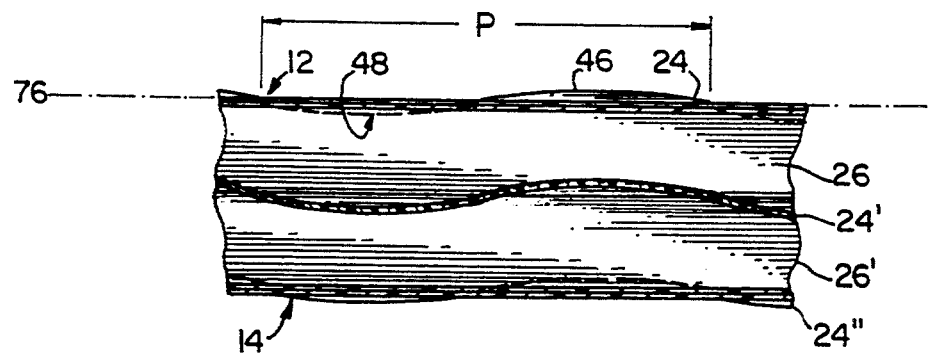
FIG. 4 is a partial cross-sectional view of the first embodiment of the assembly taken along line 4—4 of FIG. 1.

The generally planar sheet 24 is formed from a plurality of alternating strips denoted as undulating regions 60 and complementary regions 58, where the complementary regions are preferably generally flattened. Generally flattened complementary regions are, as their name implies, generally flat, with their front and rear faces, 28 and 30 respectively, both being parallel to a central major plane 76 of sheet 24, as best shown in FIGS. 4, 5 and 6A.

Each generally flattened complementary region 58 preferably has a width equal to the width of every other generally flattened complementary region, where that width is designated D'. The width D' of the generally flattened complementary region 58 is substantially equal to, or preferably slightly larger than, the width D of the flattened apices of the corrugated sheets. The generally flattened complementary regions 58 of sheet 24' are separated by a distance C', as shown in FIG. 5.

This intentional correspondence between the width D' of the generally flattened complementary regions of a generally planar sheet and the width D of the apices of a corrugated sheet contributes to the advantages of the present invention. Likewise, the intentional correspondence between the distance C' separating adjacent generally flattened complementary regions of a generally planar sheet and the distance C separating apices on the same side of a corrugated sheet contributes to the advantages of the present invention.

Disposed between any two adjacent complementary regions 58, except for those near the edges of the sheet, is an undulating region, as seen in FIGS. 1 and 7. Each undulating region is composed of two basic structures, an undulating ribbon and side walls, as best shown in FIG. 7 where undulating region 60 is seen to comprise undulating ribbon 80 and side walls 82, 82' and 84, 84'. The undulating region undulates alternatively above and then below the central major plane 76 of sheet 24. In area 88 of FIG. 7, the undulating ribbon 80 and side walls 82 and 82' are seen to undulate above the central major plane 76 of sheet 24, with a peak wavefront at line 90, while the undulating ribbon 80 and side walls 84 and 84' in adjacent area 92 is undulating below the central major plane 76 of sheet 24, with a valley wavefront at line 94.

The lines designating a wavefront for a peak or a valley of an undulating region, for example peak wavefront 90 or valley wavefront 94 in undulating region 60, may be angled relative to the longitudinal axes 44 and 62, respectively, of the corrugations of the corrugated sheet 26 and the complementary regions 58, to any extent necessary to interlock adjacent sheets 24 and 26. Preferably, the wavefronts 90 and 94 are generally transverse to the longitudinal axis 62 of a generally flat complementary region 58 in generally planar sheet 24. As used herein, "generally transverse" means extending across, but not necessarily at right angles. Thus, where the wavefronts 90 and 94 are generally transverse to the longitudinal axes 62 of the complementary regions 58, the angle X between the wavefronts and longitudinal axes, as shown on FIG. 7, may be between about 30° and about 150°, but is preferably between about 45° and about 90°.

Each undulating region comprises side walls which connect the edge of the undulating ribbon to the edge of the adjacent generally flattened complementary region. For example, the undulating ribbon 80 in area 88 of FIG. 7 contains side walls 82 and 82' which connect the adjacent generally flattened complementary regions to the undulating ribbon. The side walls which connect an undulating ribbon to a generally flattened complementary region either rise or fall at an angle from the flattened complementary region, where the angle is best seen in FIG. 5, and where the angle formed between a generally flattened complementary region 58 and the adjoining side wall of an undulating region 60 is designated as B'.

In the first embodiment of the invention, the centerline and longitudinal axis 64 of undulating region 60 preferably has a generally sinusoidal form when seen in a partial schematic view as in FIG. 6A. FIG. 6A shows one period of the sinusoidal form, where the length of the period is designated P. FIG. 4, which is a partial cross-sectional view of assembly 10 along line 4—4 of FIG. 1, also shows a period P of undulating region 60 according to the first embodiment of the invention. The centerline 64 has a maximum amplitude designated E in FIG. 6A, measured along a line perpendicular from the central major plane 76 of sheet 24. The period P and the amplitude E effectively set the angle F at which the centerline 64 rises or descends from the central major plane 76.

FIG. 6B represents a second embodiment of the invention, in which the undulating region appears as a "trapezoidal" wave in cross-section. The wave in FIG. 6B has a period P' and a maximum peak height E' measured as described above in association with FIG. 6A. The wave rises or descends from the central major plane at an angle F', as shown in FIG. 6B. In addition, the repeating unit in FIG. 6B has truncated apices, each with a width G.

FIG. 6C represents a third embodiment of the invention, in which the undulating region appears as a "sawtooth" wave in cross-section. The wave in FIG. 6C has a period P", and a maximum peak height E" measured as described above in association with FIG. 6A. The wave rises or descends from the central major plane at an angle F", as shown in FIG. 6C.

According to the present invention, between every two generally planar sheets is a corrugated sheet. The corrugations of the corrugated sheet preferably, but not necessarily, run in a linear manner and are substantially parallel to each other, as can be seen in FIGS. 1, 2, 3 and 5. A corrugated sheet provides separation between two generally planar sheets, and due to the particular configuration of a corrugated sheet and its interaction with adjacent generally planar sheets, there are created parallel tubes which, according to the first embodiment of the invention, take the form of long, generally trapezoidal flutes 98 as can be seen in FIGS. 2, 3 and 5.

When assembled as in assembly 10, the corrugated sheets and the generally planar sheets are configured so that the central major plane of a generally planar sheet, such as plane 76 of sheet 24, is parallel to the major plane of an adjacent corrugated sheet, such as plane 72 of sheet 26. Furthermore, the corrugated and generally planar sheets are positioned so that the complementary and preferably generally flat regions 58 of the generally planar sheet are disposed in overlapping adjacent relation to and abut the preferably flat apices 40 of the corrugated sheets.

A generally planar sheet has particular structures which correspond to particular structures in a corrugated sheet. This intentional correspondence in particular structures of a generally planar sheet and a corrugated sheet provides a mechanism by which the two sheets are readily aligned together and then secured to form a rigid and sturdy assembly.

The shape of the complementary regions of a generally planar sheet intentionally corresponds to the shape of the apices of a corrugated sheet, where that shape is generally flat according to a preferred embodiment of the invention. The width D of a flattened apex in corrugated sheet 26 intentionally corresponds to, or preferably is slightly smaller than, the width D' of a generally flattened complementary region in generally planar sheet 24. The distance C that separates alternating apices in the corrugated sheet 26 intentionally corresponds to, or preferably is slightly larger than, the distance C' that separates adjacent generally flattened complementary regions in generally planar sheet 24. The angle B' that is formed between a generally flattened complementary region 58 and the adjacent side walls of the undulating region 60 of generally planar sheet 24 intentionally corresponds to the angle B that is formed between a flattened complementary apex 40 and an adjacent angled wall 42 in corrugated sheet 26. The angle A' that is formed between a side edge of generally planar sheet 24 and a longitudinal axis of a generally flattened complementary region of sheet 24 intentionally corresponds to the angle A formed between a side edge of corrugated sheet 26 and a longitudinal axis of a corrugation of sheet 26. This intentional correspondence between specific features of a generally planar sheet and a corrugated sheet allows for the generally flattened complementary regions of the generally planar sheet to be disposed in overlapping adjacent relation to and abut the apices of the corrugated sheet when the two sheets are brought together in intimate contact.

When the generally planar sheet 24 and the corrugated sheet 26 are brought together so that the generally flattened complementary regions of sheet 24 are disposed in overlapping adjacent relation to and abut the generally flattened complementary apices of sheet 26, the two sheets may be fastened together by adhesive bonds between the abutting apices of the corrugations of corrugated sheet 26 and the generally flattened complementary regions of generally planar sheet 24. Alternatively, the abutting apices of the corrugations of corrugated sheet 26 and the generally flattened complementary regions of generally planar sheet 24 may be joined by cohesive bonds formed by thermal welding, ultrasonic bonding, or any other suitable method of creating cohesive bonds.

The assembly 10 of the present invention may be fabricated from sheets formed from a variety of different materials. For example, a thermoplastic material such as plasticized or unplasticized polyvinyl chloride, polystyrene, various other engineering thermoplastics and alloys of such materials may be used to form the present sheets. In addition, metals such as galvanized steel, aluminum, copper, materials such as asbestos or cellulose and composite materials such as fibrous cellulosic stock impregnated with a thermoplastic resin or the like may be used to form the sheets of the present invention. Additionally, the assembly 10 may be prepared from stone or concrete, including cement. Presently, when the assembly 10 is used as tube settler for water purification, it is preferred that polyvinylchloride (PVC) be used to form the sheets.

Examples of other resins and engineering resins which may be used in accordance with the present invention include acrylonitrile-butadiene-styrene (ABS), styrene-acrylonitrile (SAN), polyphenylene oxides, polycarbonates, polyether sulphones, polyaryl sulphones, polyethylene, polystyrene, polyvinylidene halides and the like. The choice of a particular material is determined by the application conditions, as will be recognized by those of ordinary skill in the art. For example, for use as an artificial reef, it is preferred that the sheets be formed from polyvinyl chloride to attract microbes which form the foundation of the reef food chain.

Individual sheets of the present assembly 10 may be manufactured by any conventional technique suited to material from which the sheet is to be made. For example, the sheets may be thermally formed by conventional prior art processes such as pressure forming, vacuum forming, molding, hot stamping, or the like.

The sheets may be assembled at a manufacturing plant or at the site where the assembly 10 is to be used. Since the generally planar sheets are substantially alike, and the corrugated sheets are substantially alike, it is not necessary to describe each of the generally planar sheets 24 and 24' or the corrugated sheets 26 and 26'. Also, since each of the generally planar sheets are substantially alike, and since each of the corrugated sheets are substantially alike, the respective types of sheet nest or stack with like kind when aligned. This is helpful in reducing the volume during shipping and storage.

The assembly 10 is expected to find its primary use in water and wastewater treatment processes, where it may serve as a tube settler for separating particulates and sediment from water. In its capacity as a water-purification device, the assembly 10 should be positioned so that water should be forced up through the flutes. For maximum effectiveness, the water should flow through the flutes at a relatively slow rate.

In fabricating assembly 10 to serve as a tube settler for water purification, certain dimensions for various features of the tube settler are preferred. Typical dimensions for a tube settler assembly of 10 sheets are 2 feet (ft) (about 0.6 meter (m)) high, 8 ft (2.4 m) wide and 1 ft (0.3 m) deep, although any other suitable dimensions may be applicable for a particular use.

The tube settler of the invention has an angle A, which is substantially equal to angle A', where that angle is preferably between about 50° and about 70°. The tube settler of the invention also has an angle B, which is substantially equal to angle B', where that angle is preferably between about 90° and about 135°. The tube settler of the invention has a distance C which is substantially equal to or slightly larger than the distance C', where distance C is preferably from about 2 in (about 5 cm) to about 5 in (about 13 cm). The tube settler of the invention has a distance D which is substantially equal to or slightly shorter than the distance D', where distance D is preferably from about 0.5 in (about 1.3 cm) to about 2 in (about 5 cm). The tube settler of the invention includes embodiments having periods P, P' and P'', where a typical period is preferably between about 1 in (about 2.5 cm) and about 18 in (about 46 cm). The tube settler of the invention includes embodiments having amplitudes E, E' and E'', where a typical amplitude is preferably between about 1/16 in (about 0.1 cm) and about 1 in (about 2.5 cm). The tube settler of the invention includes embodiments having angles F, F' and F'', where a typical angle is preferably between about 5° and about 60°.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An assembly comprising a first corrugated sheet and a second generally planar sheet, the corrugations forming alternating apices on opposite sides and equidistant from a central major plane in the first sheet, the apices in the first sheet being connected by angled walls, the second sheet having a central major plane which is generally parallel to the central major plane of the first sheet, the second sheet having complementary regions disposed in overlapping adjacent complementary relation to, and abutting the apices of, the first sheet, and undulating regions disposed between the complementary regions, the undulating regions alternating above and below the central major plane of the second sheet, the undulating regions alternating above the central major plane of the second sheet having a peak wavefront and the undulating regions alternating below the central major plane of the second sheet having a valley wavefront, whereby the wavefronts of the undulating regions are angled with respect to longitudinal axes of the complementary regions to an extent necessary to interlock adjacent first and second sheets.

2. The assembly according to claim 1, wherein the corrugations of the first sheet are substantially parallel to each other.

3. The assembly according to claim 1, wherein the corrugations of the first sheet are disposed at an oblique angle to an edge of the first sheet.

4. The assembly according to claim 1, wherein the wavefronts of the undulating regions of generally transverse to longitudinal axes of the complementary regions.

5. The assembly according to claim 1, wherein the sheets comprising the assembly are fastened together by adhesive bonds between the abutting apices of corrugations of the first sheet and the complementary regions of the second sheet.

6. The assembly according to claim 1, wherein the sheets comprising the assembly are fastened together by cohesive bonds between the abutting apices of corrugations of the first sheet and the complementary regions of the second sheet.

7. The assembly according to claim 1, wherein the complementary regions are flat.

8. The assembly according to claim 1, wherein the alternating undulating regions extend above and below the central major plane of the second sheet to provide a plurality of side walls alternating above and below the complementary regions, the side walls having a dimension extending from the complementary region sufficient to interlock the corrugations of the first sheet with abutting complementary regions.

9. The assembly according to claim 8, wherein the complementary regions are flat.

10. The assembly according to claim 8, wherein the side walls extend a distance of about 1/16 inch to about 1.0 inch from the complementary region.

11. The assembly according to claim 8, wherein the side walls intersect the central major plane of the second sheet at an angle of about 5 to about 60 degrees.

12. The assembly according to claim 8, wherein the undulating regions are generally sinusoidal in a cross-section through the central major plane of the second sheet along the wavefronts.

13. The assembly according to claim 8, wherein the undulating regions are generally trapezoidal in a cross-section through the central major plane of the second sheet along the wavefronts.

14. The assembly according to claim 8, wherein the undulating regions are generally sawtooth in a cross-section through the central major plane of the second sheet along the wavefronts.

15. The assembly according to claim 8, further comprising a plurality of alternating first sheets and second sheets.

16. The assembly according to claim 1, wherein the undulating regions are generally sinusoidal in a cross-section through the central major plane of the second sheet along the wavefronts.

17. The assembly according to claim 1, wherein the undulating regions are generally trapezoidal in a cross-section through the central major plane of the second sheet along the wavefronts.

18. The assembly according to claim 1, wherein the undulating regions are generally sawtooth in a cross-section through the central major plane of the second sheet along the wavefronts.

19. The assembly according to claim 1, further comprising a plurality of alternating first sheets and second sheets.

* * * * *